US012415607B2

(12) United States Patent
Gonzalez (10) Patent No.: US 12,415,607 B2
(45) Date of Patent: Sep. 16, 2025

(54) FORCE ABSORBING SHOULDER BELT ASSEMBLIES ESPECIALLY USEFUL FOR AIRCRAFT OCCUPANT SEATS

(71) Applicant: Textron Aviation Inc., Wichita, KS (US)

(72) Inventor: Dean Ross Gonzalez, Wichita, KS (US)

(73) Assignee: TEXTRON INNOVATIONS INC., Providence, RI (US)

( * ) Notice: Subject to any disclaimer, the term of this patent is extended or adjusted under 35 U.S.C. 154(b) by 179 days.

(21) Appl. No.: 18/472,142

(22) Filed: Sep. 21, 2023

(65) Prior Publication Data
US 2025/0100690 A1 Mar. 27, 2025

(51) Int. Cl.
*B64D 11/06* (2006.01)
*B60R 21/055* (2006.01)
*B60R 22/28* (2006.01)
*B60R 22/34* (2006.01)
*B60R 22/46* (2006.01)

(52) U.S. Cl.
CPC .......... *B64D 11/062* (2014.12); *B60R 21/055* (2013.01); *B60R 22/341* (2013.01); *B60R 22/3413* (2013.01); *B60R 22/4676* (2013.01); *B60R 2022/286* (2013.01)

(58) Field of Classification Search
CPC . B60R 21/055; B60R 22/341; B60R 22/4676; B60R 2022/286; B60R 22/1951; B60R 22/3413
See application file for complete search history.

(56) References Cited

U.S. PATENT DOCUMENTS

| 2,622,664 | A | * | 12/1952 | Koehler | ................ B60R 22/105 244/122 B |
| 3,694,028 | A | | 9/1972 | Andres et al. | |
| 3,765,700 | A | * | 10/1973 | Littmann | .............. B60R 22/341 280/805 |
| 4,060,278 | A | | 11/1977 | Maeyerspeer | |

(Continued)

FOREIGN PATENT DOCUMENTS

CN 107672554 A * 2/2018 ............. B60R 22/26

*Primary Examiner* — William Kelleher
(74) *Attorney, Agent, or Firm* — Nixon & Vanderhye, P.C.

(57) ABSTRACT

Force absorbing shoulder belt assemblies for vehicle seats, especially aircraft seats, are provided. The shoulder belt assemblies will include a box structure defining an interior space having an open rear end and adapted to being fixed to adjacent vehicle structure, a block of a compressible material positioned within the interior space of the box structure, a rear plate in pressing contact with the rear face of the block of compressible material, and an inertial reel assembly carried by the rear plate and including a shoulder web strap which extends through the rear plate, the block of compressible material and the box structure. When a deceleration force of predetermined magnitude is exerted on the shoulder web strap of the inertial reel, the rear plate will responsively be forcibly pressed against the block of compressible material thereby compressively crushing the compressible material within the box structure to thereby absorb shock force of the shoulder web strap against vehicle seat occupant's torso.

18 Claims, 7 Drawing Sheets

(56) References Cited

U.S. PATENT DOCUMENTS

| | | | | |
|---|---|---|---|---|
| 4,627,639 | A | * | 12/1986 | Sedlmayr ............... B60R 22/201 |
| | | | | 280/801.2 |
| 5,211,694 | A | * | 5/1993 | Sakakida ............... B60R 22/341 |
| | | | | 188/374 |
| 5,544,918 | A | * | 8/1996 | Fleming ................ B60R 21/015 |
| | | | | 280/805 |
| 5,566,978 | A | * | 10/1996 | Fleming .............. B60R 22/1951 |
| | | | | 297/480 |
| 5,700,034 | A | * | 12/1997 | Lane, Jr. ................. B60R 21/01 |
| | | | | 280/805 |
| 5,700,545 | A | | 12/1997 | Audi et al. |
| 6,068,664 | A | | 5/2000 | Meyer et al. |
| 6,336,664 | B1 | * | 1/2002 | Roder ................. B60R 22/1958 |
| | | | | 297/480 |
| 6,561,580 | B1 | | 5/2003 | Bergey |
| 6,736,427 | B2 | * | 5/2004 | Herrmann ............... B60R 22/28 |
| | | | | 280/805 |
| 6,913,288 | B2 | | 7/2005 | Schulz et al. |
| 10,442,393 | B2 | | 10/2019 | Jaradi et al. |
| 2005/0012319 | A1 | | 1/2005 | Schulz |
| 2008/0303325 | A1 | | 12/2008 | Scholz |
| 2010/0109395 | A1 | * | 5/2010 | Ruthinowski ........ B60N 2/2809 |
| | | | | 267/140.13 |
| 2017/0267208 | A1 | * | 9/2017 | Marriott ................ B60R 22/203 |
| 2019/0071059 | A1 | * | 3/2019 | Besier ................... B60T 8/4081 |
| 2019/0202397 | A1 | * | 7/2019 | Jaradi ................. B60R 22/1952 |
| 2025/0100690 | A1 | | 3/2025 | Gonzalez |

* cited by examiner

FORCE ABSORBING SHOULDER BELT ASSEMBLIES ESPECIALLY USEFUL FOR AIRCRAFT OCCUPANT SEATS

FIELD

The embodiments disclosed herein relate generally to force absorbing shoulder belt assemblies for vehicle occupant seats, especially aircraft occupant seats. The assemblies disclosed herein may however also find utility in occupant seats employed in the related fields of automotive, rail, and machinery industries.

BACKGROUND

Conventional shoulder belts (especially shoulder belts associated operatively with inertial reels) are well known safety devices used in a variety of vehicles, including aircraft, in combination with conventional lap belts. The use of shoulder belts will thus prevent sudden and large deceleration forces from propelling the seat occupant forwardly thereby minimizing if not preventing injury due to the occupant being dislodge from the seat and/or striking structures located forwardly adjacent to the seat (e.g., instrument panels, forwardly adjacent seat structures, interior aircraft monuments and the like).

While seat belts are important safety features for vehicle seats, they are typically inelastic and thus large deceleration forces can be transferred by the shoulder belt to the occupant's body. If the deceleration force is sufficiently high, therefore, the occupant's body, especially the occupant's torso region, could be injured by the shoulder belt itself. This possibility is especially critical for aircraft seats which must meet certain certification criteria by governmental authorities with regard to the maximum allowable deceleration forces (colloquially called "g-forces" which are a multiple of the standard gravitational force). For this reason, several energy absorbing systems have been proposed such as those described in U.S. Pat. Nos. 4,060,278, 5,700,545 and 6,561,580 (the entire contents of each being expressly incorporated hereinto by reference).

Although there have been prior proposals to provide energy absorbing systems for shoulder belts and/or occupant seats, there is a continued need for improvements. It is towards providing such improvements that the embodiments disclosed herein are directed.

SUMMARY

In general the embodiments disclosed herein are directed toward shoulder belt assemblies for vehicle seats (e.g., aircraft seats) which absorb and thereby reduce shoulder belt forces on the upper torso of a seat occupant in the event of a rapid deceleration event (e.g., a vehicle crash). According to certain embodiments, the force absorbing shoulder belt assembly will include a box structure adapted to being fixed to adjacent vehicle structure which defines an interior space having a forward side wall having an elongate slot and an open rear end opposite the forward side wall. A block of a compressible material is positioned within the interior space of the box structure and defines an elongate channel therethrough which is aligned with the elongate slot of the forward side wall of the box structure.

A rear plate is positionally placed in contact with a rear face of the block of compressible material at the open end of the box structure and defines an elongate passageway therethrough. An inertial reel assembly is carried by the art plate and includes a shoulder web strap extending through the elongate passageway of the rear plate, the elongate channel of the block of compressible material and the elongate slot of the forward side wall of the box structure for manual manipulation by the seat occupant. The rear plate may include a mounting arm projecting aftwardly away from the rear plate and to which the inertial reel assembly is connected so as to be carried by the rear plate The opposed edges of the elongate slot of the forward side wall may include elongate anti-chafing grommets.

In response to a deceleration force of predetermined magnitude exerted on the shoulder web strap along a force vector, the inertial reel will thereby forcibly move the rear plate forwardly against the block of compressible material to compressively crush the compressible material within the box structure to thereby absorb shock force of the shoulder web strap against a torso of an occupant of the vehicle seat.

According to some embodiments, the block of compressible material will comprise a block of compressible metal honeycomb, preferably a block of aluminum honeycomb. The block of aluminum honeycomb will be positioned in the interior space of the box structure such that elongate cells of the honeycomb are aligned substantially with the force vector.

The rear plate is positionally restrained within and thereby prevented from being separated from the box structure during normal flight operations by a pair of L shaped press pads connected to the box structure. In this regard, opposed side walls of the box structure may include connection lobes with the L-shaped press pads being connected to a respective connection lobe.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which.

DETAILED DESCRIPTION OF EMBODIMENTS

Figure 1:
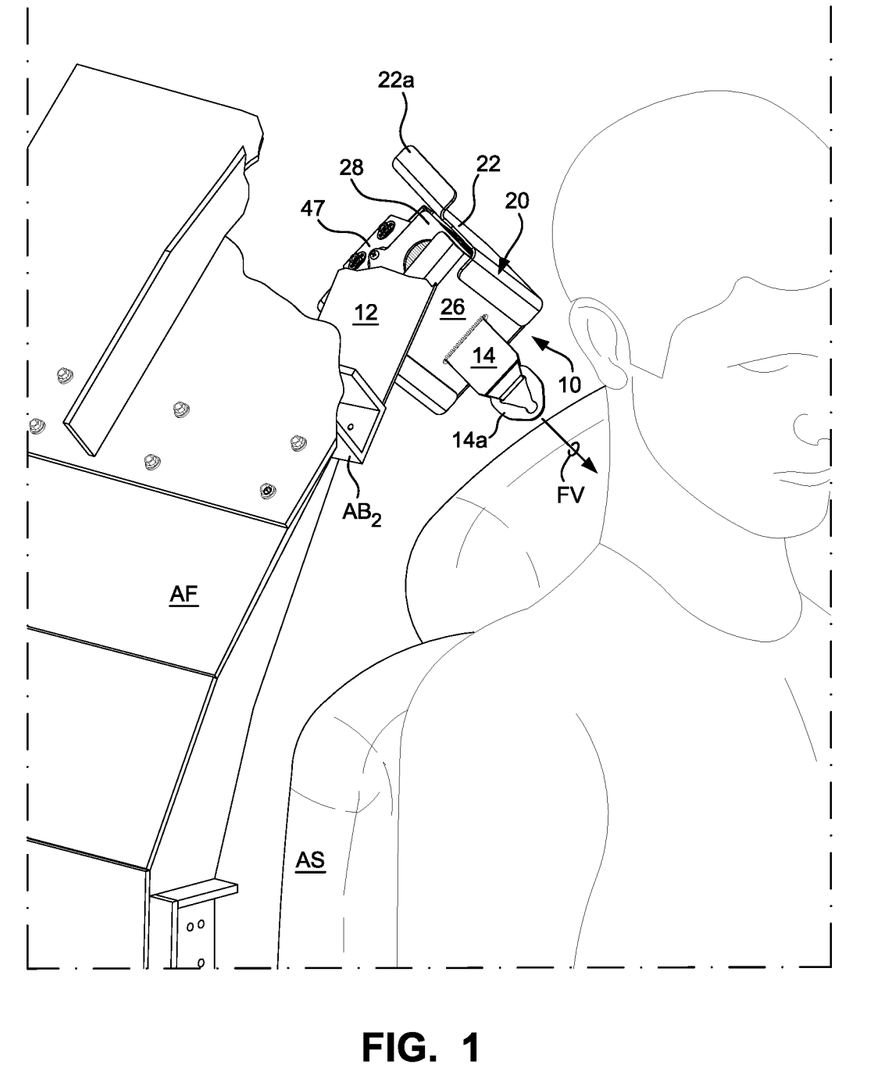
FIG. 1 is a front perspective environmental view showing an energy absorbing shoulder belt assembly in accordance with an embodiment of this invention in operative association with an aircraft occupant seat.
Figure 2:
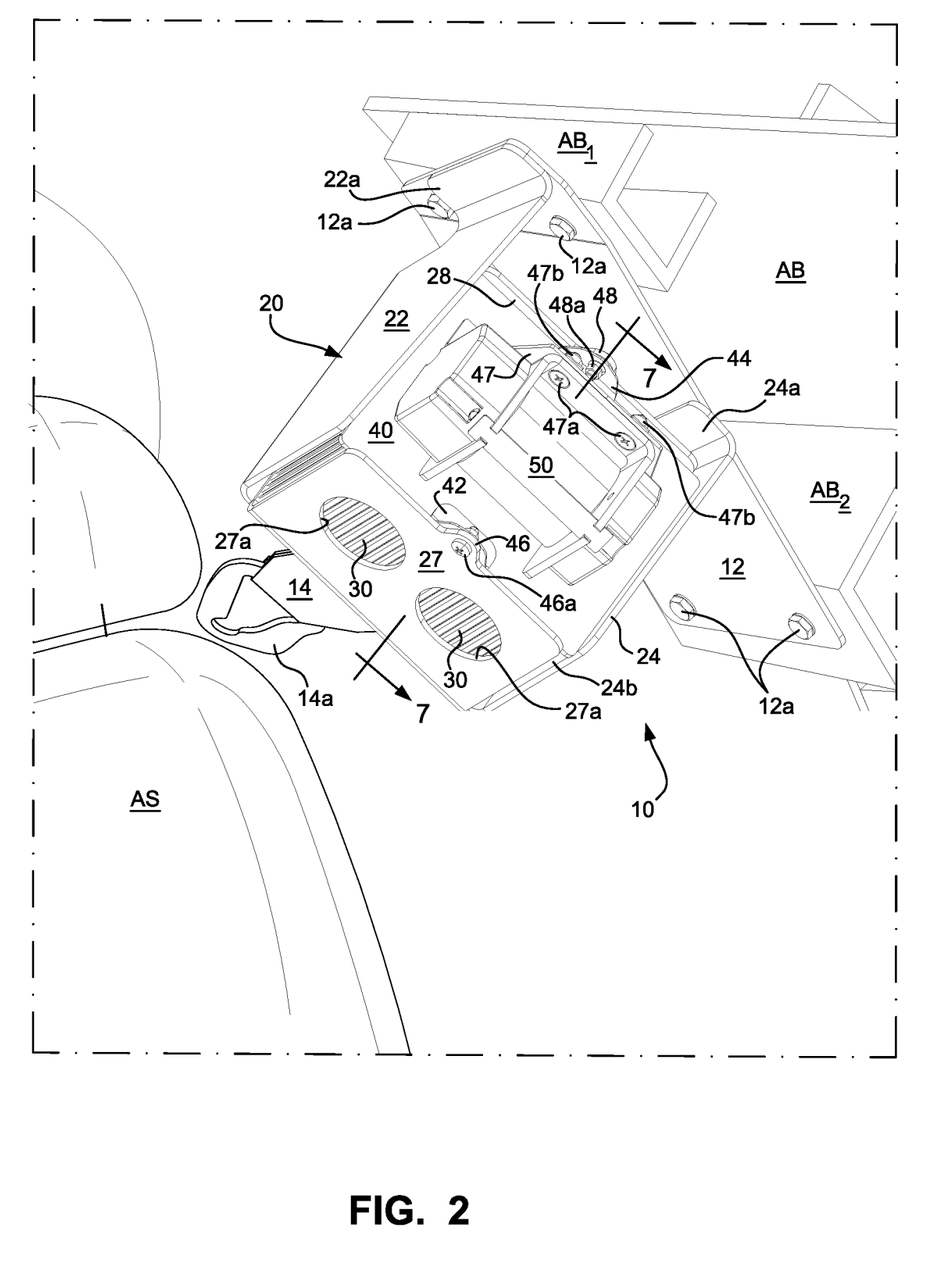
FIG. 2 is a rear perspective environmental view thereof.
Figure 3:
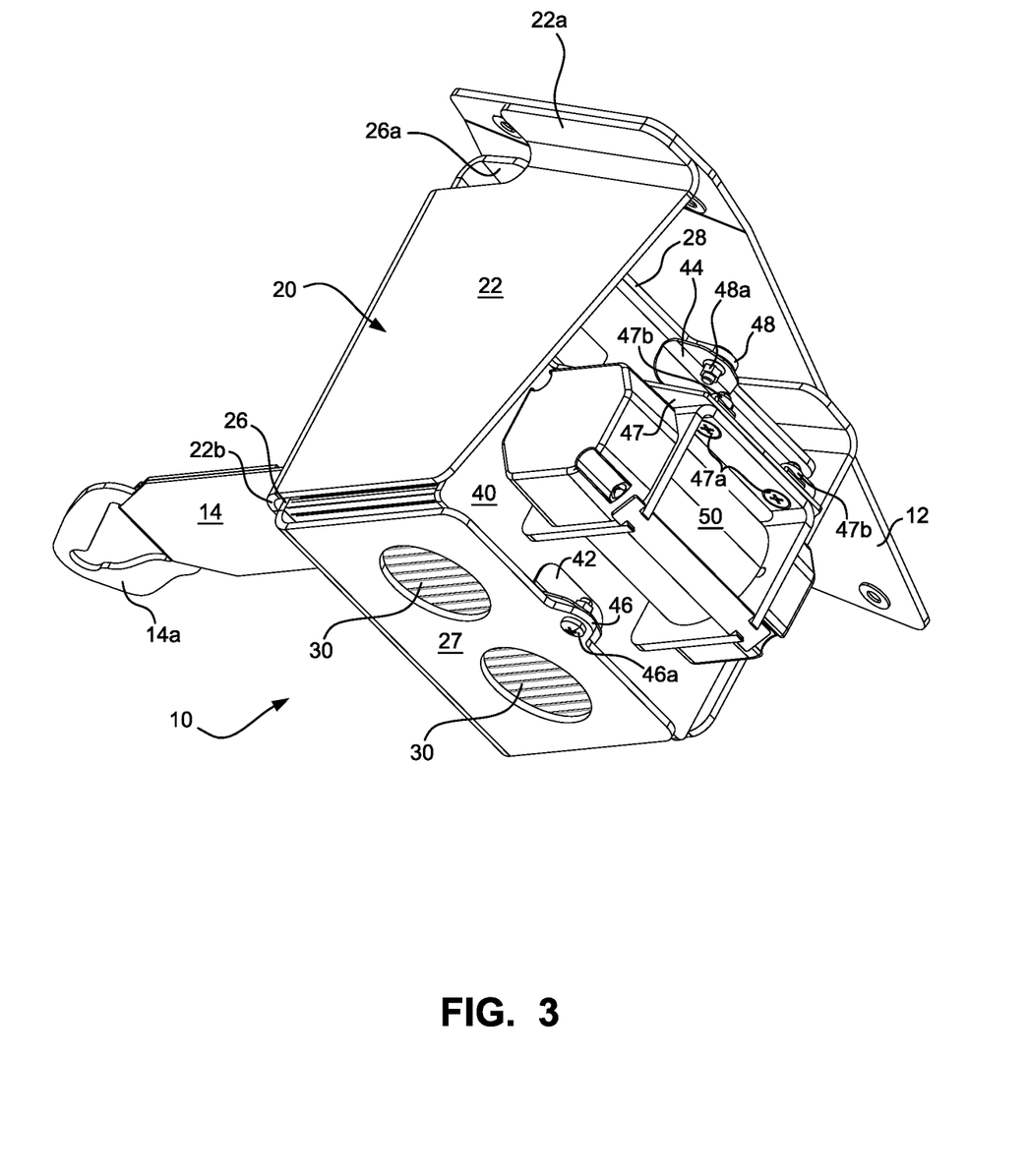
FIG. 3 is a rear perspective view of the energy absorbing shoulder belt assembly depicted in FIGS. 1 and 2, respectively.
Figure 4:
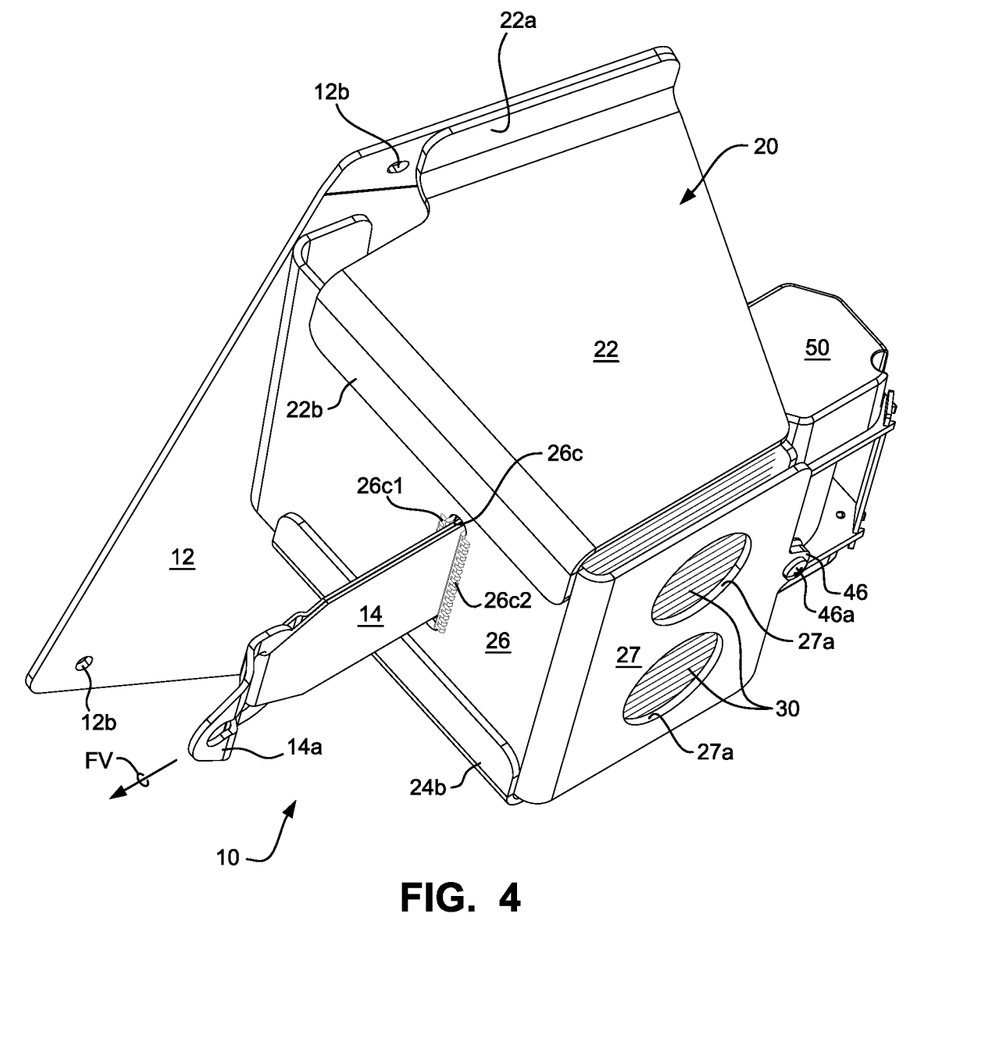
FIG. 4 is a front perspective view thereof.
Figure 5:
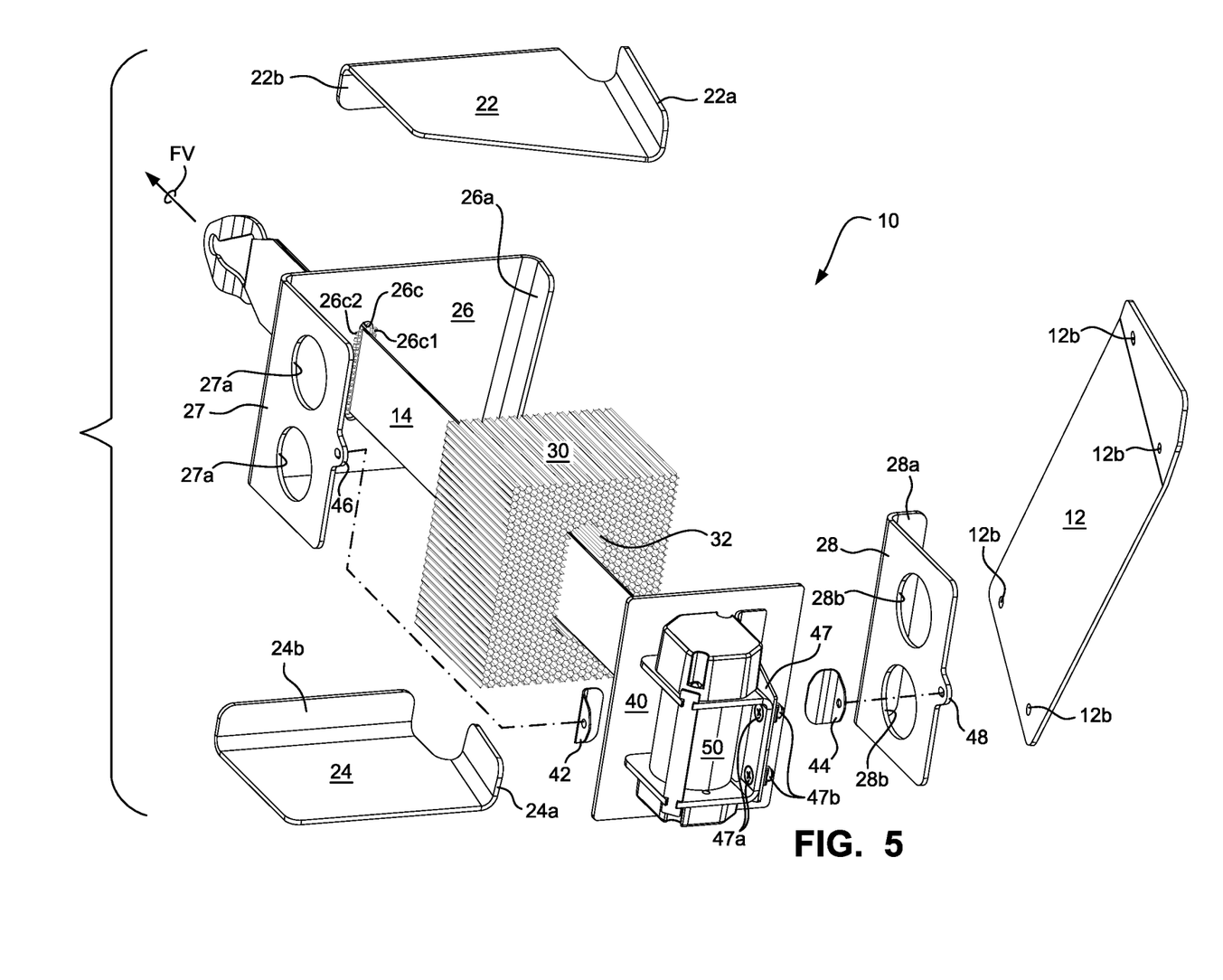
FIG. 5 is a bottom rear perspective exploded view of the structural components comprising energy absorbing shoulder belt assembly depicted in FIGS. 3 and 4.
Figure 6:
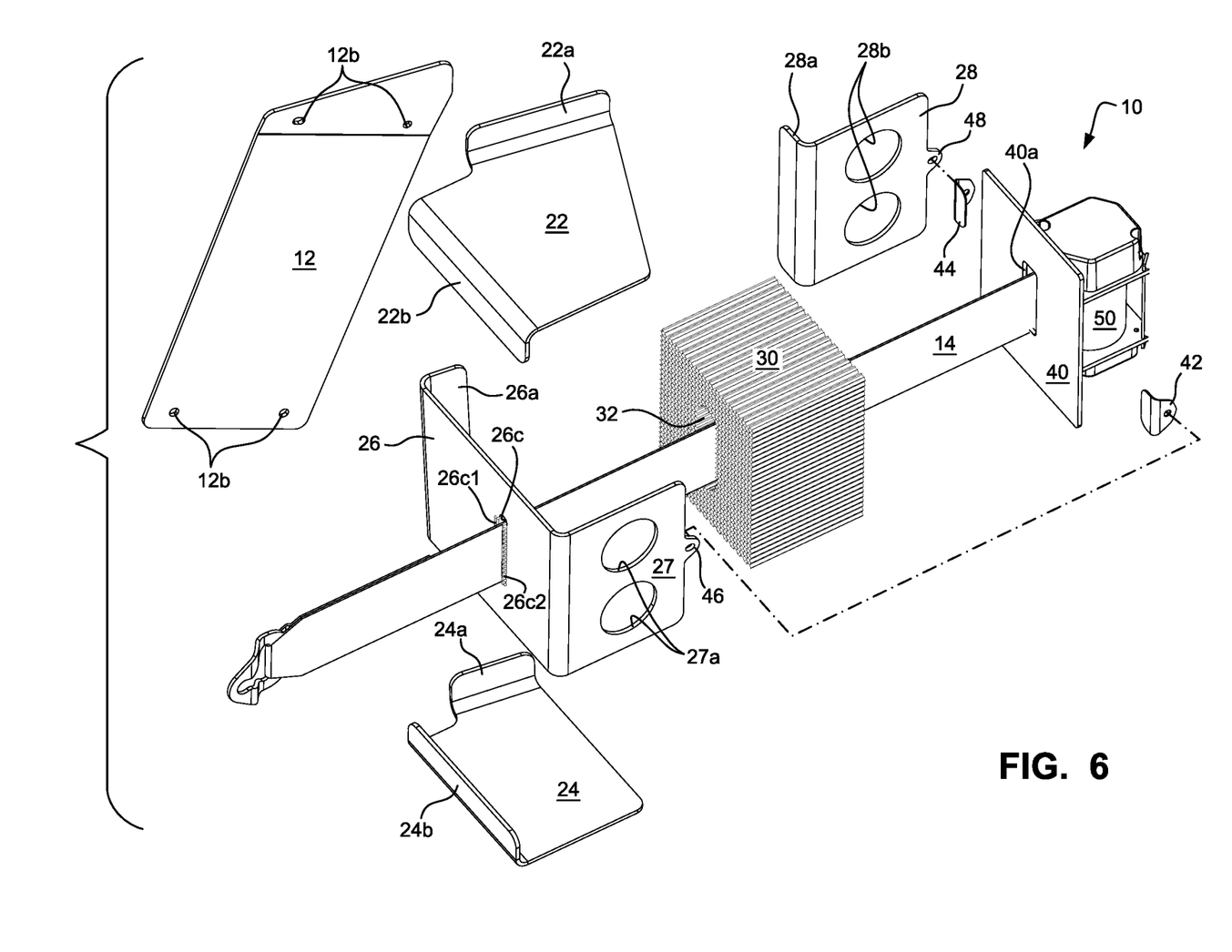
FIG. 6 is a bottom front perspective exploded view thereof.

As is shown in FIGS. 1 and 2, an exemplary aircraft occupant seat AS is provided with an energy absorbing shoulder belt assembly 10 in accordance with an embodiment of this invention which is immovably attached to adjacent aircraft fuselage structure AF by an airframe bracket AB. The airframe bracket AB will preferably include an upper inboard mounting bracket AB1 and a lower outboard mounting bracket AB2 to which a base mounting plate 12 of the belt assembly is rigidly attached. The inboard and outboard mounting brackets AB1, AB2, respectively, are configured so that the plane of the base mounting plate 12 is angularly skewed downwardly inboard relative to a vertical plane parallel to the aircraft's longitudinal axis. Such an angular skew of the base mounting plate 12 will in turn position the shoulder belt assembly 10 so that the shoulder web strap 14 in use extends across the seat occupant's torso region in substantial alignment with a force vector FV of the anticipated deceleration forces acting thereon (see FIG. 1). Such alignment of the shoulder web strap 14 and the force vector FV will ensure that anticipated deceleration forces will be exerted substantially entirely through the shoulder web belt to the shoulder belt assembly 10 so it can perform its force absorbing function to be described hereinbelow.

It will of course be understood that although the shoulder belt assembly 10 is shown and discussed herein as being positioned so that the shoulder web belt 14 extends over and across a seat occupant's upper right shoulder and crosses the seat occupant's torso diagonally to the seat occupant's lower left waist area where the end connection buckle 14a can be connected to a waist seat belt buckle (not shown), the structures discussed and shown herein could also be configured so that the shoulder belt assembly 10 is positioned in a substantial mirror image so that the shoulder web strap 14 extends over and across the seat occupant's left shoulder and then diagonally across the seat occupant's torso to the lower right waist area.

As is perhaps more clearly shown in FIGS. 3-6, the shoulder belt assembly 10 generally includes a box structure 20 formed of upper and lower side wall plates 22, 24 each having unitary bent upper tabs 22a, 24a immovably riveted to the base mounting plate 12 and forward tabs 22b, 24b immovably riveted to the forward side wall plate 26. The forward side wall plate 26 is preferably a one-piece structural plate element having a lower inboard bent region thereby forming a unitary inboard side wall plate 27 and an upper outboard bent region forming a unitary upper mounting tab 26a that is immovably riveted to the base mounting plate 12. The inboard side wall plate 27 may further include relatively large diameter openings 27a for the purpose of weight reduction. An outboard side wall plate 28 is positioned opposite to the inboard side wall plate 27 and includes a forward bent portion forming a forward mounting tab 28a that is immovably riveted to the forward side wall plate 26. The outboard side wall plate 28 may similarly include relatively large diameter openings 28b for weight reduction purposes. The base mounting plate 12 and hence the box structure 20 which is riveted to the base mounting plate are collectively rigidly attached, for example by bolt and nut assemblies 12a (see FIG. 2) extending through the mounting apertures 12b (see FIGS. 5 and 6), to the inboard and outward mounting brackets AB1, AB2, respectively, which are in turn fixed to the adjacent aircraft fuselage structure AF.

A compressible block 30 formed of a rigid yet compressible material is received within the interior space defined by the box structure 20. In accordance with preferred embodiments, the compressible block 30 is most preferably in the form of a block of aluminum honeycomb which is positioned within the box structure 20 so that the individual elongate cells thereof are aligned substantially with the force vector FV. The thickness of the block 30 of honeycomb material as well as the number and/or cross-sectional geometry of the individual cells thereof will depend on the total amount of deceleration force that is required, for example, by certification criteria. Depending on the specific end use application and the design force loads that may be encountered, the block 30 of compressible material 30 may alternatively be embodied in other compressible plastic and/or metal materials, such as a porous, foamed or expanded compressible rigid plastic or metal materials.

The forward surface of the block 30 is most preferably adhesively joined to the inner surface of the forward wall plate 26. An elongate tunnel 32 is formed through the block 30 of compressible material which is aligned with the force vector FV and with an elongate slot 26c formed in the forward side wall plate 26. The opposed upper and lower edges of the elongate slot 26c are preferably provided with correspondingly elongate upper and lower grommets 26c1, 26c2 formed of a suitable plastic material (e.g., nylon) that serve as anti-chafing devices for the shoulder web strap 14 (which is typically formed of a woven fabric material).

A rear plate 40 is positioned at the open rear end of the box structure 20 in pressing contact with a rear face of the block 30 of compressible material therewithin. The rear plate 40 is moreover sized and configured so as to be nestably received within the interior space of the box structure 12 during compressive collapse of the block 30 of compressible material as will be explained in greater detail hereinbelow. The rear plate 40 is positionally maintained by being pressed onto the aft surface of the block 30 of compressible material within the interior space of the box structure by a pair of L-shaped press pads 42, 44. The upper flanges of the press pads 42, 44 are fixed to the lobes 46, 48 associated with the inboard and outboard side walls 27, 28 by bolt and nut assemblies 46a, 48a, respectively, while the lower flanges of the press pads 42, 44 are pressed against the rear plate 40 to urge the rear plate 40 into contact with the rear face of the block 30 of compressible material.

Figure 7:
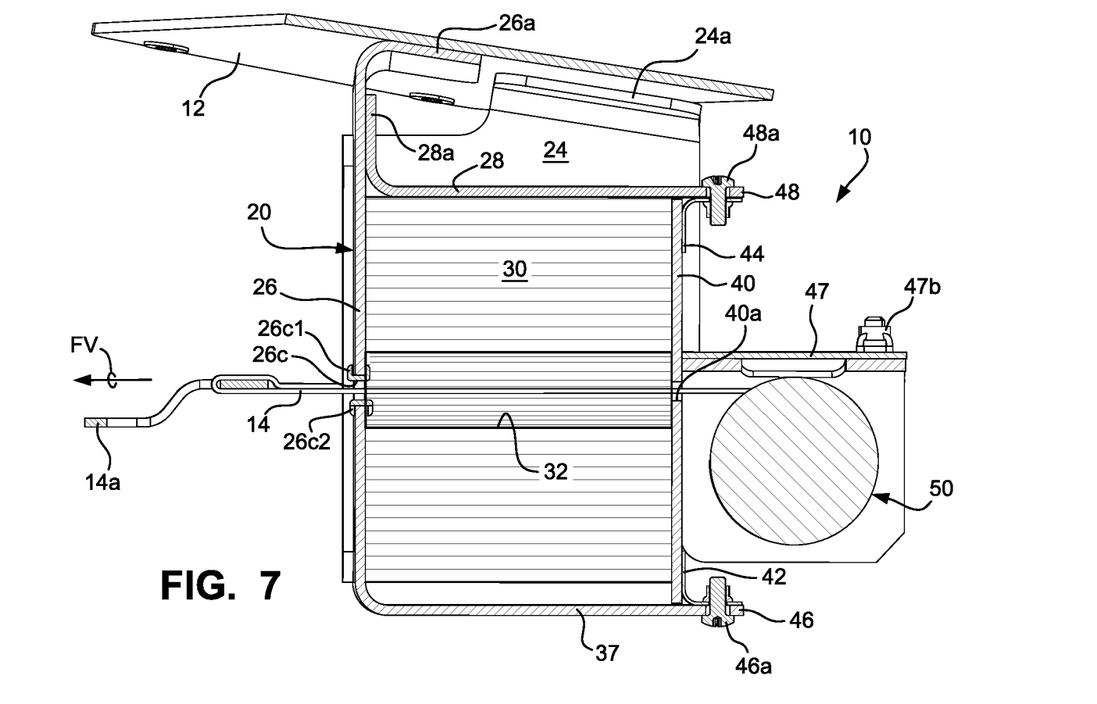
FIG. 7 is a cross-sectional elevational view of the energy absorbing shoulder belt assembly as taken along lines 7-7 in FIG. 2 shown in a normal operational condition.

The rear plate 40 includes a rearward projecting mounting arm 47 which in turn is rigidly connected by the bolts 47a and associated nuts 47b to an inertial shoulder strap assembly 50 which includes the shoulder web strap 14. The rear plate 40 defines an elongate passageway 40a to accept the shoulder web strap 14 of the inertial shoulder strap assembly 50 therethrough which is in alignment with the elongate tunnel 32 formed substantially in the center region of the block 30 of compressible material 30 and with the elongate slot 26c defined in the forward side wall plate 26 (see FIG. 7). The alignment of the elongate passageway 40a, the tunnel 32 and slot 26c with the force vector FV thereby allow the shoulder web strap 14 operatively associated with the shoulder strap assembly 50 to be extended therethrough and accessible by an occupant of the aircraft seat AS. The aircraft seat AS occupant may therefore extend the shoulder web strap 14 over the seat occupant's shoulder and then diagonally across the occupant's torso where the end connection buckle 14a can be connected to a waist seat belt buckle (not shown) as previously discussed without interference of any structure associated with the shoulder belt assembly 10. Thus, during normal operational use, the occupant is allowed to lean forwardly in the aircraft seat AS causing the shoulder web strap 14 to be paid out from the inertial reel assembly 50 since the forward force of such movement is insufficient to activate the arresting function of the inertial reel assembly 50 which would then preclude further pay out of the shoulder web strap 14 therefrom.

Figure 8:
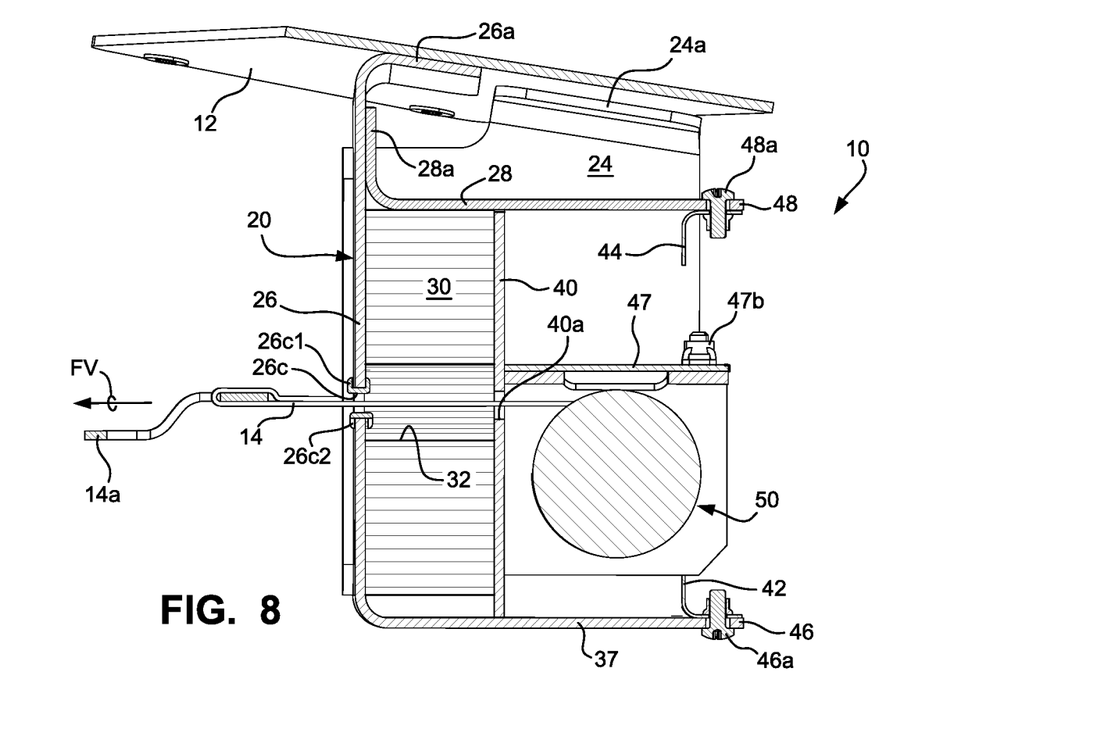
FIG. 8 is a cross-sectional elevational view of the energy absorbing shoulder belt assembly shown in FIG. 7 but in a post-crash condition.

In response to a sudden and excessive forward (decelerative) force above a minimum design threshold, however, the inertial reel assembly 50 would similarly activate to prevent the shoulder web strap 14 from paying out. As such, the arrested shoulder web strap 14 would then prevent the occupant of the aircraft seat AS from being forwardly propelled similar to normal operational use. However, if the deceleration force along the force vector FV was sufficiently sudden and excessively large beyond a predetermined amount (e.g., a rapid deceleration force that would occur in an aircraft crash event), the forwardly directed force would be transferred to the inertial reel assembly 50 which in turn would cause the rear plate 40 to which the inertial reel assembly 50 is rigidly mounted via the bracket 42 to move forwardly in the direction of the force vector FV against the block 30 thereby compressively crushing the compressible material thereof. Such a state is depicted in FIG. 8. The inertial reel assembly 50 would similarly be carried forwardly with the rear plate 40 during the compressive crushing of the block of compressible material 30. Such forward movement of the inertial reel assembly 50 allows the excessive force to be absorbed by the block 30 of compressible material which in turn prevents such excessive force from being transferred to the torso region of the occupant of the aircraft seat AS via the shoulder web strap 14.

While reference has been made to particular embodiments of the invention, various modifications within the skill of those in the art may be envisioned. Therefore, it is to be understood that the invention is not to be limited to the disclosed embodiments, but on the contrary, is intended to cover various modifications and equivalent arrangements included within the spirit and scope thereof.

What is claimed is:

1. A force absorbing shoulder belt assembly for a vehicle seat comprising:
   a box structure adapted to being fixed to adjacent vehicle structure, the box structure having an interior space and includes a forward side wall defining an elongate slot and an open rear end opposite the forward side wall;
   a block of a compressible material positioned within the interior space of the box structure defining an elongate channel therethrough which is aligned with the elongate slot of the forward side wall of the box structure;
   a rear plate in contact with a rear face of the block of compressible material at the open end of the box structure and defining an elongate passageway therethrough; and
   an inertial reel assembly carried by the rear plate and including a shoulder web strap extending through the elongate passageway of the rear plate, the elongate channel of the block of compressible material and the elongate slot of the forward side wall of the box structure, wherein
   a deceleration force of predetermined magnitude exerted on the shoulder web strap along a force vector causes the inertial reel to forcibly move the rear plate forwardly against the block of compressible material to compressively crush the compressible material within the box structure to thereby absorb shock force of the shoulder web strap against a torso of an occupant of the vehicle seat.

2. The force absorbing shoulder belt assembly according to claim 1, wherein the block of compressible material comprises a block of compressible metal honeycomb.

3. The force absorbing shoulder belt assembly according to claim 2, wherein the block of compressible metal honeycomb is an aluminum honeycomb.

4. The force absorbing shoulder belt assembly according to claim 3, wherein the block of aluminum honeycomb comprises elongate cells that are aligned substantially with the force vector.

5. The force absorbing shoulder belt assembly according to claim 3, wherein the elongate slot of the forward side wall includes opposed edges and elongate anti-chafing grommets operatively associated with the opposed edges.

6. The force absorbing shoulder belt assembly according to claim 1, further comprising a pair of L-shaped press pads connected to the box structure and engaged with the rear plate so as to positionally restrain the rear plate within the box structure.

7. The force absorbing shoulder belt assembly according to claim 6, wherein
   the box structure includes a pair of opposed side walls each having a connection lobes, and wherein
   the L-shaped press pads are connected to a respective connection lobe of the opposed side walls.

8. The force absorbing shoulder belt assembly according to claim 1, wherein the rear plate includes a mounting arm projecting aftwardly away from the rear plate, and wherein the inertial reel assembly is connected to the mounting arm so as to be carried by the rear plate.

9. A vehicle seat which comprises the force absorbing shoulder belt assembly according to claim 1.

10. The vehicle seat according to claim 9, wherein the vehicle seat is an aircraft seat.

11. An aircraft seat comprising:
    an aircraft seat assembly adapted to support a seated occupant therein; and
    a force absorbing should belt assembly rigidly connected to adjacent aircraft structure; wherein the force absorbing shoulder belt assembly comprises:
    (i) a box structure adapted to being fixed to adjacent vehicle structure which defines an interior space having a forward side wall having an elongate slot and an open rear end opposite the forward side wall;
    (ii) a block of a compressible material positioned within the interior space of the box structure defining an elongate channel therethrough which is aligned with the elongate slot of the forward side wall of the box structure;
    (iii) a rear plate in contact with a rear face of the block of compressible material at the open end of the box structure and defining an elongate passageway therethrough; and
    (iv) an inertial reel assembly carried by the rear plate and including a shoulder web strap extending through the elongate passageway of the rear plate, the elongate channel of the block of compressible material and the elongate slot of the forward side wall of the box structure, wherein
    a deceleration force of predetermined magnitude exerted on the shoulder web strap along a force vector causes the inertial reel to forcibly move the rear plate forwardly against the block of compressible material to compressively crush the compressible material within the box structure to thereby absorb shock force of the shoulder web strap against a torso of an occupant of the vehicle seat.

12. The aircraft seat according to claim 1, wherein the block of compressible material comprises a block of compressible metal honeycomb.

13. The aircraft seat according to claim 12, wherein the block of compressible metal honeycomb is an aluminum honeycomb.

14. The aircraft seat according to claim 13, wherein the block of aluminum honeycomb comprises elongate cells that are aligned substantially with the force vector.

15. The aircraft seat according to claim 11, wherein the elongate slot of the forward side wall includes opposed edges and an elongate anti-chafing grommet operatively associated with the opposed edges.

16. The aircraft seat according to claim 1, further comprising a pair of L-shaped press pads connected to the box structure and engaged with the rear plate so as to positionally restrain the rear plate within the box structure.

17. The aircraft seat according to claim 16, wherein
the box structure includes a pair of opposed side walls each having a connection lobes, and wherein
the L-shaped press pads are connected to a respective connection lobe of the opposed side walls.

18. The aircraft seat according to claim 11, wherein the rear plate includes a mounting arm projecting aftwardly away from the rear plate, and wherein the inertial reel assembly is connected to the mounting arm so as to be carried by the rear plate.

\* \* \* \* \*